United States Patent [19]

Miyagi et al.

[11] Patent Number: 5,002,614

[45] Date of Patent: Mar. 26, 1991

[54] PROCESS FOR EXTRACTING LIPIDS (CANE WAX) FROM SUGAR CANE MOLASSAS

[75] Inventors: Sadao Miyagi; Kenichi Ohshiro; Akio Sakugawa, all of Okinawa, Japan

[73] Assignee: Daiichi Seito Kabushiki Kaisha, Japan

[21] Appl. No.: 332,741

[22] Filed: Apr. 4, 1989

[30] Foreign Application Priority Data

Apr. 23, 1988 [JP] Japan .................................. 63-099342

[51] Int. Cl.$^5$ .......................... C11B 11/00; C13J 1/00; C13D 3/02
[52] U.S. Cl. ........................................ 127/48; 127/43; 260/412; 260/420; 260/428.5
[58] Field of Search .................... 127/48, 43; 260/412, 260/420, 428.5

[56] References Cited

U.S. PATENT DOCUMENTS

| | | | |
|---|---|---|---|
| 2,449,107 | 9/1948 | Broeg et al. | 260/428.5 |
| 2,456,661 | 12/1948 | Wilder | 260/428.5 |
| 2,938,028 | 5/1960 | Platt et al. | 260/412 |
| 3,931,258 | 1/1976 | Lake | 260/412 |
| 4,063,960 | 12/1977 | Paley | 127/48 |

OTHER PUBLICATIONS

Meade-Chen, Cane Sugar Handbook, Tenth Ed., John Wiley and Sons (1977),"Sugarcane Wax," pp. 175-179.

*Primary Examiner*—Chung K. Pak
*Attorney, Agent, or Firm*—William J. Daniel

[57] ABSTRACT

The lipid content, i.e. "cane wax", is extracted from cane molasses by the steps of:
(a) adjusting the cane molasses with sufficient alkali to pH 8.0 and 12.4;
(b) adding to the pH adjusted molasses a lower alcohol in an amount to provide an alcohol concentration in the range of between 85 and 60 Vol % while heating to 60° C.±10° C., and removing the resultant residual solids as a sludge to yield a clarified liquid;
(c) reducing the alcohol concentration of the clarified liquid to 50-15 Vol %;
(d) adjusting the temperature of the resultant liquid to 45° C.±10° C. and then cooling the same to a temperature 20° C.±15° C. and efficient to precipitate the lipids therefrom; and
(e) recovering the precipitated lipids routinely by isolation or filtration.

5 Claims, 2 Drawing Sheets

PROCESS FOR EXTRACTING LIPIDS (CANE WAX) FROM SUGAR CANE MOLASSAS

BACKGROUND OF THE INVENTION (A) Field of the Invention

This invention relates to a method for the separation and recovery of cane lipids contained in cane molasses, etc., by extracting the same with a lower alcohol.

Cane lipids (commonly called "cane wax") which are present in sugarcane bark are a whitish waxy substance assumed to be present for the protection of the bark surface. As the comsumption of natural waxes like carnauba wax and candida wax is increasing in various areas such as for the lubrication of office automation machines and equipment, for car wax, and in cosmetics manufacture, there is a shortage in the available supply since these substances are collected in distant and isolated areas such as the interior of Brazil along the Amazon River or the deserts of Mexico. Cane wax is attracting attention as a substitute for these better known natural waxes.

(B) Description of Related Art

As cane wax is found on the cane bark surface, it has heretofore been extracted from the cane bark (e.g. the method of Japanese Patent Application Laid Open Sho No. 59-53427) or from the solid residue of pressed cane (hereinafter referred to as "bagasse").

It is said that as early as in the World War I cane wax was extracted from bagasse using such solvents as benzene and toluene in the Republic of South Africa and Java. However, the practice is said to have been abandoned after the war because the recovery rate of the solvent was low and there was substantially no way for recycling the bagasse after extraction.

It was assumed that owing to the improved performance of clarifying systems for cane juice, any cane wax in the squeezed cane juice would tend to adhere to the filter cake in the juice clarifying operation and scarcely remain in the clarified juice. From around 1960, therefore, extraction of cane wax from the filter cake was practiced on an industrial scale in Cuba, Australia, etc. This method likewise proved defective similar to bagasse in that the recovery rate of solvents such as benzene and toluene is low or that the filter cake after recovery of wax has substantially no utility. This method was additionally disadvantageous for economic reasons because the filter cake spoils so readily, e.g. in one day, and its operation is seasonal and of very limited duration. The manufacture was hence totally discontinued by around 1980.

There has been no mention in the past up to the present either in literatures or actual production reports of, the idea of or any attempt at recovering cane wax from the cane juice in the post-process of cane juice clarification.

SUMMARY OF THE PROBLEMS TO BE SOLVED BY THE INVENTION

The use of bagasse or cane filter cake as a material in extracting cane wax, as mentioned above is uneconomical.

While the cane wax content per se is large in bagass, the capacity of the extraction equipment required to handle the large volume of solids becomes huge, as does the amount of solvent needed for such extraction. The cost of solvent to replace that lost during operation likewise becomes substantial. Because of the seasonal availability of these source materials, on the other hand, the equipment utilization ratio is poor, reducing economic efficiency, thus, and large-scale machinery and equipment would have to sit unused for long periods of time. Efficient industrial operation calls for easy-to-store and inexpensive source materials which are available irrespective of seasons of the year.

It is desirable that the end product remains after the extraction of the cane wax have some utility source otherwise its disposal causes problems which become aggravated over time. In fact, the end product should preferably be endured with an increased value as a consequence of the extraction (as impurity, i.e. cane wax, is eliminated).

Further, as sugar cane products are commonly used for food purposes, any technology for sugar cane should warrant safety to humans and not generate wastes contributing to pollution of the environment.

During a comprehensive investigation, the inventors of the present application discovered quite unexpectedly that the content resulting from cane wax is high in waste molasses of sugar cane processing, waste molasses from a sugar refinery, or waste fermentation liquid obtained from such molasses after use thereof in liquid culture, particularly in waste molasses from sugar cane whose content is as high as ca. 6 times that of dark brown sugar, and furthermore that there materials can all be stored with ease, and are inexpensive and highly economical to obtain.

However, since these materials all contain glucide, amino acid, organic acid etc. which can be recycled for further use, solvents such as benzene, toluene and chloroform which advantageously dissolve wax but not glucides cannot be used because, such solvents are toxic to humans and render unfit for further use the by-product materials after extraction. Lower alcohols, particularly ethanol which is suitable for use in the food field, are possible candidates as a prospective solvent. However, lower alcohols dissolve both cane wax and glucides, and it was substantially impossible to isolate and separately recover these two substances efficiently following the prior art.

SUMMARY OF THE INVENTION

A. Underlying Technical Conclusions

The inventors made repeated studies to solve the above mentioned problems, and discovered the following technical conclusions (as will be described in detail in Example II). When an aqueous alcohol solution of molasses having a pH in the alkaline region is so adjusted that the concentration of said alcohol varies in respective levels within the range of 90 Vol % and 15 Vol %, then left to cool, heated to 45° C.±10° C., and left standing at 20° C.±15° C., the following results are obtained:

(1) A large quantity of pigments (including black melanoidine pigments which cannot be removed by the activated-sludge process) will aggregate and form a sediment when the alcohol concentration is 90–60 Vol %, (2) A large quantity of salts (calcium salt, aconitic acid salt, etc.) precipitate and form a sediment when the alcohol concentration is 60–50 Vol %, and (3) Cane wax precipitates and sediments efficiently when the alcohol concentration is 50–15 Vol %.

These findings are utterly new, and form the basis of an efficient process in extracting cane wax from waste molasses.

B. Proven of the Present Invention and Variations

The process of the present invention generally includes the following steps.

(a) Cane molasses is combined with an alkali to adjust its pH between pH 8.0 and 12.5.

(b) The mixture is mixed with a lower alcohol so that the alcohol concentration would be between 85 and 60 Vol % while being heated to 60° C.±10° C. to form a precipitate which is removed by filtration filtered to obtain clarified liquid.

(c) The alcohol is separated and removed from the clarified liquid in sufficient amount to reduce the alcohol concentration to 50–15 Vol %.

(d) The liquid is then heated to 45° C.±10° C. and then allowed to stand while its temperature is lowered to 20° C.±15° C. to precipitate cane wax.

(e) The precipitated cane wax is recovered routinely by isolation or filtration.

As a variation between the steps (b) and (c) of the general process above, an additional step may be inserted wherein the clarified liquid obtained in step (b) is freed of enough alcohol to adjust its alcohol concentration to 65–55 Vol %, heated to 45° C.±10° C. and then allowed to stand while its temperature is reduced to 20° C.±15° C. to precipitate and remove salts present in the liquid, such as calcium salt and aconitic acid salt.

In another variation, either of the above processes can be modified by adding carbon dioxide to saturation to mixture of the clarified liquid obtained in step (b) and a reprocessed solution of the sludge produced in step (b) (clear liquid obtained by dissolving hot sludge in alcohol and filtering the same) to adjust the pH of the mixture in a neutral or weakly alkaline region and after filtering, using the same in step (c).

In another variation, instead of sugar cane molasses directly, the startup material can be concentrated residue obtained by ultrafiltration of waste fermentation liquid containing waste molasses from sugar refineries or cane molasses and of pressed cane juice.

DETAILED DESCRIPTION OF THE INVENTION

Suitable alkalis include, without limitation, calcium hydroxide and caustic soda. Methanol, ethanol, propanol and butanol are preferable as lower alcohol, but the present invention is in no way limited by them. Ethanol is optimal from the stand point of toxicity.

For adjustment of alcohol concentration in step (c) and thereafter, a part of alcohol in the solution in question may be removed, or alcohol may be removed totally first and then a suitable amount of alcohol may be added anew.

When adjusting the pH of the startup molasses to alkalinity in step (a) of the present invention, a pH around 12 is most desirable as will be described later in detail. When this molasses is mixed under heating with a large amount of alcohol to obtain an alcohol concentration in the range of 90–60 Vol %, a large amount of pigments contained in the startup molasses become aggregated and precipitated, increasing the purity and clarity of the final liquid product. These pigments include melanoidine pigments which cannot be removed by the activated-sludge process and other liquid clarification processes. As these contaminants are mainly removed, implementation of this invention will help reduce pollution, thus serving a double purpose.

Steps (c) and (d) are the core of the present invention. When the alcohol concentration is adjusted to 50–15 Vol %, most of the cane wax present precipitates to form a sediment. The rest remains in the liquid as fine particles, which can be recovered using pulp fiber mats or polypropylene adsorbent films.

The precipitated cane wax is isolated by separatory funnels or recovered by filtration, which may be performed routinely.

As a variation of the invention of the present application, it is useful to add a desalination step i.e. a salt removing step, after decolorization in step b by adjusting the alcohol concentration in two stages, i.e. between 90–65% Vol % respectively and 65–55 Vol %. It is effective to carry out the desalination step between steps (b) and (c).

In order to recover a small amount of cane wax entrained in the aggregated precipitate (sludge) formed in step (b), it is also useful to dissolve the sludge in alcohol before filtration and mix the reprocessed solution thus obtained with the initially clarified liquid. It is desirable to add carbonic acid to the clarified mixture liquid and to adjust the pH to be neutral or weakly alkaline before filtration.

As has been mentioned, the present invention wherein cane wax is extracted from waste molasses with alcohol makes possible an industrial-scale extraction of cane wax from sugar cane, which has heretofore entailed difficulties. Moreover, the method is highly economical because inexpensive alcohols of below 90 Vol % can be used. This invention is advantageous in that it not only avoids waste water from molasses processing plants from polluting the environment but also permits recycling for further use of the molasses by-product freed of its impurity, cane wax, and thus in a form more safe for haman consumption.

EXAMPLES OF THE INVENTION

The invention will now be described below by way of illustrative examples.

EXAMPLE 1

Five hundred and eighty (580) ml (824.5 g) of waste molasses from a cane sugar factory was added with 511 ml of water to obtain 1,091 ml of diluted solution. Five hundred (500) ml (378 g) of the solution was collected, mixed with calcium hydroxide to adjust its pH to 12.0, heated to 60° C., mixed with 6 times its volume of 80% ethanol (3,000 ml) and stirred. The resultant aggregated precipitate was filtrated under reduced pressure with No. 2 filter paper to obtain clarified liquid. Three hundred and twenty (320) g of sludge obtained was further mixed with twice the above amount of 60 Vol % ethanol, stirred and filtrated under reduced pressure to obtain a reprocessed solution of the sludge. This was mixed with said filtrate, and the mixture was saturated with carbon dioxide to adjust its pH to 8.0 and filtrated with No. 2 filter paper to remove the calcium carbonate produced. The filtrate thus obtained was totally freed of alcohol using a rotary evaporator, and 195.4 g of decolorized clear syrup of Brix 53.8 was obtained. One hundred and thirty-four (134) ml (167.3 g) of the syrup was collected, mixed with 250 ml of 80 Vol % ethanol, and an additional 116 ml of water to obtain 500 ml of precisely 40 Vol % aqueous ethanol/sugar solution. The solution was heated to 50° C., placed in a 500 ml measuring cylinder, and allowed to stand for 4 hours at room temperature, whereby 70 ml of precipitate was formed at the bottom of the cylinder. Four hundred (400) ml of the supernatant was carefully removed by suction using a rubber tube, and the remaining 100 ml of the solution and the precipitate was filtrated through No. 131 filter paper, and vacuum dried. It weighed 1.93 g, which is equivalent to 2.1% of the total solid content or 0.51% of 378 g of the stock molasses. When dissolved in chloroform, the dried substance easily dissolved and was confirmed to be cane wax.

Further, after chloroform was distilled off, 100 ml of acetone was added and dissolved. The insoluble residue was filtrated with No. 2 filter paper. When the filtrate was freed of acetone under heating, 0.444 g of white crystals was recovered, which was confirmed to be equivalent to 23% of the total amount of dry cane wax previously recovered.

In the meantime, 500 ml (378 g) of the Brix-adjusted solution was mixed with calcium hydroxide to adjust its pH to 9.0, heated to 50° C. and similarly added with 6 times the above amount of 80 Vol % ethanol. The resultant precipitates of dark brown melanoidine were filtrated with No. 2 filter paper. The filtrate was mixed with 1N $H_2SO_4$ to adjust its pH to 7.0, and further filtrated with No. 2 filter paper. The alcohol/sugar solution was removed of alcohol using a rotary evaporator to obtain in total 330 g of syrup of Brix 50.4.

Two hundred and fifty (250) ml of 80 Vol % ethanol and 105.3 ml of water were added to 144.7 ml of the above syrup to make it 500 ml in total. This solution was similarly adjusted in ethanol concentration to 40 Vol %, heated to 50° C. and allowed to stand for 4 hours at room temperature (23° C.) in a 500 ml cylinder. A precipitate was obtained at the bottom of the cylinder, which was recovered similarly as in the case of the pH 12 solution and vacuum dried. It weighed 1.7 g.

This is equivalent to 1.9% of the solid content or 0.45% of 378 g of the stock molasses. In comparative experiments, pH 6.0 and pH 7.5 solutions were prepared separately and processed in the same manner as the solution of pH 9.0. It was confirmed that the recovery rate was somewhat higher when the solution was more alkaline.

Although the difference is marginal, extraction in a highly alkaline region is desirable since the clarified sugar solution obtained is decolorized more thoroughly when the solution is more alkaline, as shown in FIG. 1.

EXAMPLE II

In order to determine the optimum ethanol concentration is the aqueous ethanol/sugar solution for rapid precipitation of the cane wax, the following comparative test was performed. First, approximately 1,000 ml of the clarified syrup (Bx 67.0) was prepared in accordance with Example I; namely, the solution was mixed with calcium hydroxide to adjust its pH to 12.5, further mixed with 6 times the above amount of the solution of 80 Vol % ethanol and filtrated for clarification.

Six samples each weighing 134 g were collected (the solid content = 134 × 0.67 = 90 g) and mixed with ethanol and water so that the ethanol concentrations would be 8 Vol %, 16 Vol %, 32 Vol %, 40 Vol %, 50 Vol % and 64 Vol % respectively. Each was heated again to 50° C., placed in a 500 ml cylinder and allowed to stand at room temperature for 6 hours. The results as shown in FIG. 2 were obtained.

As shown in FIG. 2, the solutions settled in the timewise order of 64% > 50% > 40% > 32% > 16% > 8%. The 64 Vol % solution settled predominantly fast within 15 minutes while the 8% solution did not precipitate at all.

However, when the filtration velocities were compared in respect of 400 ml each of the supernatants above the 100 ml line of the measuring cylinder using No. 131 filter paper, they were in the order of 32% > 40% > 16% > 50% > 64% > 8%.

As the 64 Vol % solution settled predominantly fast compared to other solutions, its precipitate was suspected to be of different nature from the precipitates of other solutions containing 50% or less of ethanol. The precipitate was added to chloroform but did not dissolve at all.

A part of it was subjected to ashing to reveal that 75% of it was an inorganic substance. Further, the supernatant above the 100 ml line of the cylinder containing the 64 Vol % solution was totally freed of ethanol by distillation under reduced pressure and added anew with ethanol and water to adjust the ethanol concentration to 35 Vol %. The solution was heated to 50° C. and allowed to stand at room temperature. Again a yellowish green or white mushy precipitate settled in the amount substantially comparable to those obtained from other solutions containing 40 Vol % or less of ethanol.

CaO mg/Bx was measured and compared in respect of the ethanol-free sugar solution obtained from the supernatant processed at 40 Vol % alone and the ethanol-free sugar solution obtained by processing the solution at two stages of concentrations, i.e. 64 Vol % and 35 Vol %. The value for the former was 6,100 mg/Bx while that for the latter was 880 mg/Bx, revealing that the residual calcium content was different. It was thus confirmed that recovery by settling in two stages at 60 Vol % and 30–40 Vol % is desirable.

EXAMPLE III

Two hundred and seventy (270) ml (384.5 g) of cane molasses was prepared, mixed with 242.3 ml of water to obtain 512.3 ml of Bx 50 solution, which was mixed with milk of lime of Bx 14 to adjust its pH to 12.0. The resultant solution was heated to 55° C. and mixed with 6 times its volume (3,073.8 ml) of 80 Vol % ethanol and stirred. A large quantity of precipitate settled immediately, which was filtrated with No. 2 filter paper, and 330 g of sludge was obtained. In order to wash out the residual sugar in the sludge, 500 ml of 60 Vol % ethanol was added, and 254 g of sludge was obtained by filtration.

The filtrate initially obtained and the filtrate obtained by the second filtration of the sludge were mixed, saturated with carbon dioxide to adjust the pH to 7.5, and filtrated. The resultant clarified solution was freed of 2,800 ml of ethanol (ethanol concentration of 75 Vol %) using a rotary evaporator to adjust the residual ethanol concentration to 35 Vol %, placed in a 2,000 ml beaker, heated to 50° C., water cooled to 20° C. and allowed to stand. Cane wax started to precipitate and settle in about 4 hours at the bottom of the beaker. The supernatant was gently removed by suction with a rubber tube, and the precipitate at the bottom was filtrated with No. 131 filter paper and vacuum dried, to recover 2.11 g of dry substance, which is equivalent to 0.55% of the stock molasses.

EXAMPLE IV

One thousand and ten (1,010) g of waste molasses was collected from a sugar refinery and mixed with 280.5 ml of water to dilute it to Bx 50 at 1,000 ml. Milk of lime was further added to adjust its pH to 12.0, and the mixture was heated to 55° C., mixed with 6,000 ml of 80 Vol % ethanol and stirred. A precipitate was immediately produced and filtrated with No. 2 filter paper, and 852 ml of sludge obtained was mixed with twice its volume of 60 Vol % ethanol, stirred and filtrated. The filtrate was mixed with the initial filtrate, and the mixture was saturated with carbon dioxide saturation to saturation to adjust its pH to 7.5 and filtrated with No. 2 filter paper to obtain a clarified solution. A part of the alcohol contained, 4,000 ml (ethanol concentration 75%), was distilled off using a rotary evaporator to adjust the residual ethanol concentration to 60 Vol %. The resultant solution was allowed to cool, heated again to 50° C. and allowed to stand for 30 minutes at room temperature. White crystals precipitated and settled.

After the crystals were isolated by a separatory funnel, the remainder was filtered with No. 131 filter paper and vacuum dried, to obtain 5.89 g of dry substance, which is equivalent to 3.36% of the solid content. The suppernatant and the filtrate were removed of 2,940 ml of ethanol using a rotary evaporator to adjust the ethanol concentration to 35 Vol %, allowed to cool, heated to 50° C. and allowed to stand for 5 hours at room temperature. Cane wax subsequently precipitated and settled, which was filtrated and vacuum dried. It weighed 1.82 g. This is equivalent to 2.02% of the solid content or 0.5% of the stock molasses when calculating from the sample subjected to analysis.

The white precipitate obtained at 60 Vol % was examined, and it was found that the precipitate from waste molasses of this refined sugar was not calcium salt but aconitic acid salt.

EXAMPLE V

Three thousand and eighty-three (3,083) ml of waste fermentation liquid (Bx 6) obtained from a yeast factory using molasses as nutrient was condensed to 310 ml (381.3 g) in total to adjust its Bx to 50, which was mixed with milk of lime to adjust its pH to 12.0, heated to 60° C., mixed with 1,860 ml of 80 Vol % ethanol and stirred. The resultant precipitate was filtrated with No. 2 filter paper.

In accordance with "Example III", a clear liquid was obtained by adding carbonic acid to saturation and filtering the filtrate being freed of ethanol by distillation using a rotary evaporator and condensed to Bx 48.4. It measured 76.7 ml (93.8 g) in total. It was mixed with 189.2 ml of 80 Vol % ethanol to make it 265.9 ml in total and to adjust the ethanol concentration to 90 Vol %, heated to 50° C. and allowed to stand at room temperature. This time no precipitate was formed but scum was observed floating on the liquid surface, which was filtrated with No. 131 filter paper and vacuum dried; 3.93 g of dry substance was obtained. This is equivalent to 8.66% of the solid content.

When the filtrate was further condensed to Bx 62.8, it measured 40.6 ml (53.7 g). It was mixed with 51.9 ml of water and 92.5 ml of 80 Vol % ethanol to make it 185 ml in total and to adjust the ethanol concentration to 40 Vol %, heated to 50° C. and allowed to stand at room temperature. Again no precipitate was formed but scum was observed floating on the liquid surface (the lower layer was black in color and transparent). The scum was filtered with No. 131 filter paper and vacuum dried. It weighed 1.57 g. This is equivalent to 4.71% of the solid content, which means that 0.051% of cane wax was contained in the total 3,083 ml of Bx 6 stock solution.

EXAMPLE VI

Twenty-five (25) liters of a mixed juice pressed with a mill was collected from a cane sugar plant, filtered with wire mesh to remove bagachillo present therein and further filtered with filter cloth to remove suspended particles. A sample measuring 20 liters was condensed to 4-fold concentration using NTU-3,000 membrane (MW 20,000) of Nitto Electric Industrieal Co., and 13.8 liters of permeate and 5.2 liters of concentrate were obtained.

Nine hundred (900) ml of Bx 50 solution obtained by condensing the above concentrate (Bx 14.84) was prepared, mixed with milk of lime to adjust its pH to 12.0, mixed with 5,400 ml of 80 Vol % ethanol and stirred. The mixture was subjected to treatment as per "Example III" to obtain clarified concentrate (Bx 59) which contained no ethanol (sample solution). A portion of the sample measuring 97.4 ml was collected, mixed with 5.1 ml of water and 307.5 ml of 80 Vol % ethanol to adjust its ethanol concentration to 60 Vol %, heated to 50° C. and allowed to stand at room temperature. Greenish yellow precipitate settled, which was filtered with No. 131 filter paper and vacuum dried; 6.24 g of dry substance was obtained.

This is equivalent to 8.46% of the solid content or 1.38% of the stock solution. Further, 99.2 ml was collected anew from the initially obtained Bx 59 sample solution, mixed with 109.4 ml of water and 208.6 ml of 80 Vol % ethanol to make it 417.2 ml in total and to adjust the ethanol concentration to 40 Vol %, heated to 50° C. and allowed to stand at room temperature. When the precipitate was filtrated with a PTFE membrane and vacuum dried, 0.8 g of cane wax was obtained. This is equivalent to 1.07% of the solid content or 0.17% of the membrane-condensed stock solution.

Figure 1:
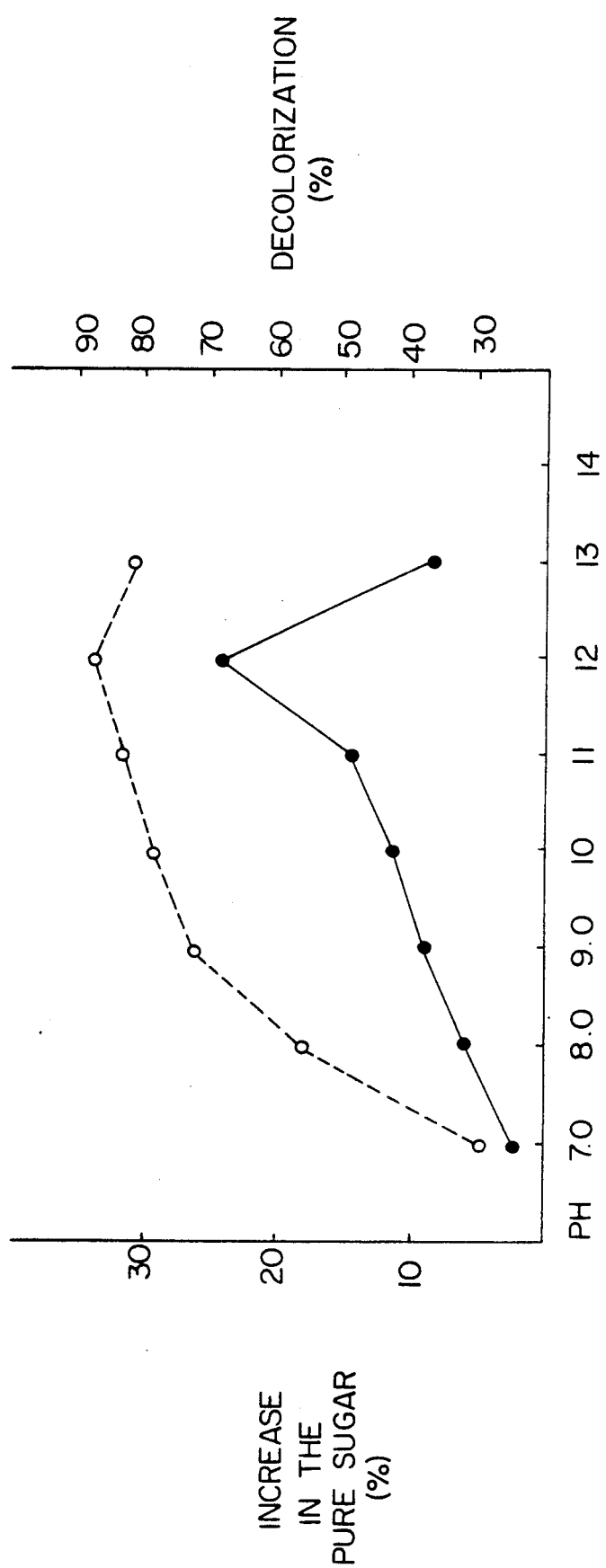
FIG. 1 is a graph showing the decolorization rate and increase in pure sugar in the different levels of pH at alkalinization of waste molasses described in Example I. In the drawing, the broken line in dots shows the decolorization rate and the solid line the increase in pure sugar.
Figure 2:
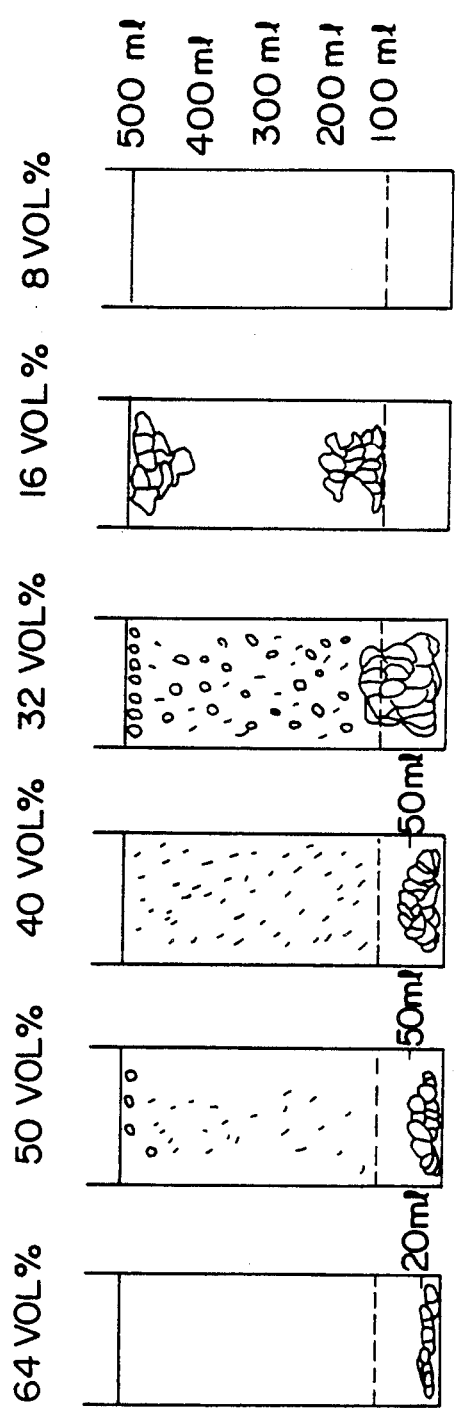
FIG. 2 shows the precipitation, aggregation and sedimentation at different ethanol concentrations of aqueous ethanol/sugar solution described in Example II.

What is claimed is:

1. A process of extracting lipids from cane molasses comprising the following steps:
   (a) adjusting the pH of said cane molasses with alkali to within the range of about pH 8.0–12.5;
   (b) adding to the resultant mixture a lower alcohol in sufficient amount to give an alcohol concentration in the range of between 85 and 60 Vol % while heating the same to 60° C.±10° C., whereby a sediment forms, and removing said sediment as sludge to yield a clarified liquid;
   (c) reducing the alcohol concentration of the alcohol-containing clarified liquid to 50–15 Vol %;
   (d) adjusting the temperature of said reduced alcohol liquid to 45° C.±10° C. and then cooling the same to 20° C.±15° C. and sufficient to precipitate the lipids therefrom; and (e) recovering the precipitated lipids.

2. The process as claimed in claim 11 which includes an additional step between steps (b) and (c), wherein sufficient alcohol is first removed from the diluted clarified liquid obtained in step (b) to adjust its alcohol concentration to 65-55 Vol %, after which the resultant liquid is heated to 45° C.±10° C., and then cooled to 20° C.±15° C. to precipitate and remove therefrom undesirable salts.

3. The process as claimed in claim 1 wherein the sludge recovered from step (b) is washed with an additional amount of said lower alcohol and after removal of undissolved solids, the wash liquid is combined with the clarified liquid from step (b) and is saturated with carbonic acid to adjust its pH to a neutral or weakly alkaline region to precipitate carbonate salts therefrom, and said precipitated carbonates are removed to yield the diluted clarified liquid of step (c).

4. The process of claim 1 wherein said lower alcohol is ethanol.

5. The process of claim 1 wherein the starting cane molasses is first diluted with water.

* * * * *

UNITED STATES PATENT AND TRADEMARK OFFICE
CERTIFICATE OF CORRECTION

PATENT NO. : 5,002,614

DATED : March 26, 1991

INVENTOR(S) : Sadao Miyagi; Kenichi Ohshiro; Akio Sakugawa

It is certified that error appears in the above-identified patent and that said Letters Patent is hereby corrected as shown below:

COLUMN 9
Claim 2, line 1, change "11" to --1--.

Signed and Sealed this

Fourteenth Day of July, 1992

Attest:

DOUGLAS B. COMER

Attesting Officer

Acting Commissioner of Patents and Trademarks